United States Patent [19]

Henkel et al.

[11] Patent Number: 4,581,290
[45] Date of Patent: Apr. 8, 1986

[54] ELECTRICAL INSULATION I

[75] Inventors: Hans-Joachim Henkel; Norbert Müller, both of Erlangen, Fed. Rep. of Germany

[73] Assignee: Siemens Aktiengesellschaft, Munich, Fed. Rep. of Germany

[21] Appl. No.: 681,069

[22] Filed: Dec. 12, 1984

Related U.S. Application Data

[63] Continuation of Ser. No. 461,553, Jan. 27, 1983, abandoned.

[30] Foreign Application Priority Data

Jan. 29, 1982 [DE] Fed. Rep. of Germany ....... 3202896

[51] Int. Cl.$^4$ .......................... C08K 3/32; C08K 5/52; H01B 3/44; C08L 23/04
[52] U.S. Cl. .............. 428/379; 174/110 PM; 174/110 SR; 428/461; 428/704; 524/140; 524/145; 524/417; 524/580
[58] Field of Search ........ 428/379, 461, 704; 524/145, 580, 417; 174/110 PM, 110 SR

[56] References Cited

U.S. PATENT DOCUMENTS

| | | | |
|---|---|---|---|
| 3,974,132 | 8/1976 | Valdiserri | 524/246 |
| 4,198,310 | 5/1980 | Lyons et al. | 524/417 |
| 4,206,260 | 6/1980 | McMahon | 428/379 |
| 4,219,607 | 8/1980 | Cammack et al. | 524/153 |
| 4,223,071 | 9/1980 | Boyer et al. | 524/417 |
| 4,325,850 | 4/1982 | Mueller | 524/228 |
| 4,337,188 | 6/1982 | Climenhage et al. | 524/245 |

FOREIGN PATENT DOCUMENTS

| | | | |
|---|---|---|---|
| 0011820 | 4/1973 | Japan | 524/417 |
| 52-45647 | 4/1977 | Japan . | |
| 2057454 | 4/1981 | United Kingdom . | |

OTHER PUBLICATIONS

Derwent Abstract, 54223E/26 (9-1981).
Derwent Abstract, 36947y/21 (J5245647) 4-1977, Dainichi.

Primary Examiner—Herbert J. Lilling
Attorney, Agent, or Firm—Kenyon & Kenyon

[57] ABSTRACT

The invention relates to electrical insulation material of a polyolefin composition with a phosphate additive which prevents the formation of so-called water trees. The phosphate additive may be a water-soluble alkali or earth-alkali phosphate and/or a hydrolysable phosphoric acid ester (RO)$_3$PO, wherein at least one of the substituents R is an aliphatic radical and the remaining substituents may be hydrogen or an aliphatic radical. The electrical insulation according to the invention is suited particularly for use in cables and wires.

4 Claims, No Drawings

ELECTRICAL INSULATION I

This application is a continuation of application Ser. No. 461,553, filed Jan. 27, 1983, now abandoned.

BACKGROUND OF THE INVENTION

The invention relates to material for electrical insulation which is made of a polyolefin composition with additives for preventing the formation of water trees. It is useful as insulation material especially in cables and wires for medium and high voltage such as about 10 kV and higher.

In electrically stressed polyolefin insulation, phenomenon can occur which is called "electrochemical treeing" (ECT) or "water treeing". This phenomenon, which is of importance particularly for the operating safety of plastic-insulated medium-and high-voltage cables, leads to the formation of tree-like structures in the insulation material, the so-called ECT structures.

The visual appearance of ECT structures which, after suitable staining are visible with particular contrast and detail, vary in size and extent. Basically, two forms can be distinguished:

"vented trees" which start at the surface of the insulation and extend into the insulation, and "bow-tie trees" which are formed in the interior of the insulation.

The mechanism of the ECT formation has not been clarified at present. However, it is believed that an electric field and the presence of water are required for the formation of the ECT structures; hence, the ECT structures are also called "water trees". The points of initiation of the water trees always seem to be faults such as impurities, aggregated admixtures, cavities, gaps, cracks or boundary surfaces, of which, however, only a part leads to the formation of water trees. From the faults, which cannot be avoided completely in insulation produced on a large technical scale, the tree-like structures extend in the direction of the electric field.

Since ECT structures represent local changes of the insulating material, they can cause damage to the insulation, especially with respect to dielectric strength. Therefore, numerous attempts have been undertaken to prevent the growth of water trees or at least to slow it down.

One of the measures for preventing the formation of water trees is to provide the insulating layer with a metallic coating or jacket, for instance, of lead or aluminum. However, cables with such a water shielding layer are not only more expensive but also heavier and therefore, more difficult to handle than cables without metal jackets.

For this reason, prevention of the formation of ECT structures has been attempted by adding additives to the polymer of the insulating layer (or adjacent layers). Of the many compounds used in this connection, the following are exemplary: lead stearate (DE-OS 24 25 760 or British Pat. No. 1,473,867), sodium chloride and sulfate or other strong electrolytes (DE-AS 25 37 283 or U.S. Pat. No. 4,042,776), salts forming stable hydrates, such as calcium and magnesium chloride, and basic anhydrides (DE-OS 28 17 804 or British Pat. No. 1,584,501), silica gel and phosphorus pentoxide (DE-OS 27 54 336: page 6, last paragraph), organosilanes (U.S. Pat. Nos. 4,144,202; 4,212,756 and 4,263,158 as well as DE-OS 28 05 875 page 3, paragraphs 2 and 3), lead oxides are basic lead compounds (DE-OS 25 23 844: claim 1, and DE-OS 28 06 752: claims 1 and 3), organic isocyanates (U.S. Pat. No. 4,282,333), silane compounds grafted on the polymer material (DE-OS 29 35 224: claim 1) and metal complexes of diketones, salicylic acid or Schiff bases (European Pat. No. A1-27 300).

In contrast with the use of salt-like compounds or electrolytes, it has also been proposed to keep the content of finely distributed water-soluble and/or hygroscopic salts in the insulation below a value of $10^{-1}$ ppm and preferably, below $10^{-4}$ ppm (DE-OS 29 11 756: page 3, paragraphs 3 and 4).

These measures, which are not consistent, have not generally produced the desired results. For example, a report by Cigré, the International High-Voltage Conference, of 1980 (see "Kunststoffe" (Plastics) 71, 1981, pages 448 et seq.) recommends that a watertight metal shield be applied to high voltage cables in order to prevent moisture from penetrating.

It is, therefore, an object of the invention to prevent effectively and permanently the formation of water trees in electrical insulation for medium and high voltage from about 10 kV up by use of suitable additives. A further object is to avoid expensive measures such as metal jackets.

SUMMARY OF THE INVENTION

These and other objects are achieved by the invention which is directed to an electrical insulating material made from a polyolefin composition with phosphate containing additives. The polyolefin composition contains as additives, water-soluble alkali or earth-alkali phosphates, hydrolysable phosphoric acid esters $(RO)_3PO$, or a combination thereof wherein at least one of the substituents R is an aliphatic radical. The remaining substituents R may be either hydrogen or an aliphatic radical.

DETAILED DESCRIPTION OF THE INVENTION

In the electical insulation composition according to the invention, the additives for preventing the formation of water trees are inorganic or organic phosphates. The inorganic phosphates, which must be water-soluble, are used in the form of alkali earth or alkali salts or a combination thereof (ammonium salts cannot be used). They are derivatives of orthophosphoric acid or pyrophosphoric acid. Primary, secondary and tertiary orthophosphates as well as acid and neutral pyrophosphates can be used. By way of example, the following compounds can be mentioned: $NaH_2PO_4$, $Na_2HPO_4$ and $Na_3PO_4$ as well as $Na_4P_2O_7$. The inorganic phosphates are preferably used in water-free form. Also, water of crystallization is preferrably not present.

The organic phosphates are hydrolysable phosphoric acid esters of the form $(RO)_3PO$, i.e., esters of orthophosphoric acid. The substituents R stand for hydrogen or an aliphatic radical, where, however, at least one of the substituents must be an aliphatic radical. The aliphatic radical includes alkyl groups with 1 to 18 carbon atoms or alkenyl groups with 2 to 18 carbon atoms. By way of example, tri-n-butylphosphate $(n-C_4H_9O)_3PO$ may be mentioned.

Besides cables and wires, the electrical insulation composition according to the invention can also find use in bushings and fittings.

In general, any polyolefin may be used as the composition of the insulator material of the invention, i.e.

cross-linked as well as non-cross-linked polyolefins are useful in the invention.

In particular, polyethylene (PE) and cross-linked polyethylene (VPE) find use in the insulation according to the invention. In addition, however, ethylene copolymers such as ethylene-propylene copolymers (EPR), ethylene-vinylacetate copolymers (EVA) and ethylene alkylacrylate copolymers (for instance, ethylene-ethylacrylate and butylacrylate copolymers) as well as ethylene-propylene-diene terpolymers and mixtures (blends) of these ethylene copolymers and terpolymers with polyolefins, especially polyethylene and polypropylene, can be employed. The foregoing polymers and polymer mixtures can be used in a cross-linked as well as a non-cross-linked state. The cross-linking can be accomplished by peroxide or by high-energy radiation.

The additive content is approximately between 0.1 and 10% by weight, relative to the total weight of the electrical insulation. In cables and wires, the phosphate compounds can be added to the insulating layer proper as well as also to the field-confining layers, i.e., to the inner and outer conducting layer. Specifically, the following applies: for inorganic phosphates, the content in the insulating layer is approximately between 1 and 5% by weight and in the conducting layer, approximately between 1 and 10% by weight; for organic phosphates, the content is approximately between 0.1 and 5% by weight and preferably approximately between 0.5 and 1% by weight, the organic phosphate being admixed to the insulating and/or the conducting layer.

The invention will be explained in further detail with the aid of embodiment examples.

EXAMPLE

To demonstrate the reduction of the formation of water trees, sheets 3 mm thick, with and without additive, of a high-purity, unstabilized, low-density thermoplastic polyethylene (LDPE) were made. For preparing insulation according to the invention, sodium phosphates at varying concentrations were admixed with sheet material samples before they were pressed. The test pieces in sheet form were then stressed electrically with 10 kV/50 Hz while both surfaces were in direct contact with a 3% sodium chloride solution heated to 70° C. The exposure time was 130 hours.

The test results showed that the phosphate-containing sheet test specimens contain, under equal test conditions, very few ECT structures as compared to the test pieces without phosphate additive. There was also found a considerable difference in the size of the ECT structures. For, while the longitudinal extent of the ECT structures in the direction of the electric field in the specimens without phosphate additive was up to 1500 μm, the phosphate-containing test pieces exhibited, in part, ECT structures under 50 μm.

In detail, the following is obtained for 1% additions of various types of sodium phosphate.

| Additive | Length of the ECT Structures | Relative Number of the ECT Structures (relative to the reference test) |
| --- | --- | --- |
| (Reference | 1500 μm | — |
| $Na_3PO_4$ | <50 μm | less |
| $Na_2HPO_4$ | <50 μm | less |
| $NaH_2PO_4$ | 100 μm | less |
| $Na_4P_2O_7$ | <50 μm | equal |

It is thus found that the ECT formation can be reduced considerably even at low phosphate concentrations. This has the further advantage that the electrical properties of the insulation are not influenced or only insignificantly so.

What is claimed is:
1. An insulated electrical conductor comprising:
   an electrically conducting metal and an electrically insulating polyolefin composition covering the metal, the composition containing a phosphate additive selected from the group consisting of from about 1% to about 10% by weight, relative to the weight of the composition, of water-soluble alkali or earth-alkali phosphates, from about 0.1% to about 5% by weight, relative to the weight of the composition, of a hydrolysable phosphoric acid ester of the formula $(RO)_3PO$ and a combination thereof, wherein R is hydrogen or an alkyl radical, provided that at least one R group is always an alkyl radical, and provided that no co-crosslinking phosphoric ester and no inorganic ammonium salts are present; said phosphate additive acting upon said polyolefin composition to prevent the formation of water trees when the conductor is dielectrically stressed by the presence of an electric field.

2. A conductor according to claim 1, wherein the phosphate additive is present in water-free form.

3. A conductor according to claim 1, wherein the phosphate additive is a sodium phosphate.

4. A conductor according to claim 1 wherein the additive is a water-soluble alkali or earth-alkali phosphate.

* * * * *